United States Patent [19]

Lehmann

[11] 4,047,822
[45] Sept. 13, 1977

[54] FITTING FOR AN ARTICLE OF FURNITURE
[76] Inventor: Oskar Lehmann, 4933 Blomberg, Donop 85, Germany
[21] Appl. No.: 633,176
[22] Filed: Nov. 19, 1975
[30] Foreign Application Priority Data
  Nov. 29, 1974 Austria .................................. 9569/74
[51] Int. Cl.² ............................................. F16B 21/02
[52] U.S. Cl. .................................... 403/187; 403/245; 52/285
[58] Field of Search ................. 52/754, 755, 756, 757, 52/285; 403/231, 238, 239, 245, 246, 323, 187, 316, 407

[56] References Cited
U.S. PATENT DOCUMENTS

| 747,854 | 12/1903 | Clark | 403/407 |
|---|---|---|---|
| 3,410,584 | 11/1968 | Bus | 52/775 |
| 3,580,535 | 5/1971 | Naske | 52/754 |
| 3,730,568 | 5/1973 | Giovannetti | 52/757 |
| 3,871,777 | 3/1975 | Sauer | 403/323 |

FOREIGN PATENT DOCUMENTS 1,300,357  7/1969  Germany ............................... 52/756

Primary Examiner—Andrew V. Kundrat
Attorney, Agent, or Firm—Lane, Aitken, Dunner & Ziems

[57] ABSTRACT

A fitting for detachably interconnecting two walls of an item of furniture at an angle to one another. The fitting comprises a bearing body locatable in one wall, which body has two bores formed therein, a rotatable torsion bolt being located in one bore and a portion of a tightening bolt in the other bore. On its external surface the torsion bolt is grooved. The two bores communicate with one another. In use, the head of the tightening bolt engages with the groove in the torsion bolt, and the opposed end of the tightening bolt engages in the other wall whereby rotation of the torsion bolt locks the tightening bolt in position and causes said walls to be interconnected.

3 Claims, 17 Drawing Figures

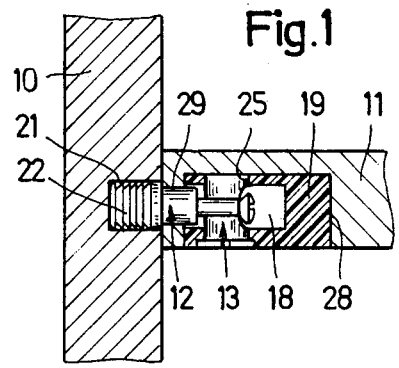
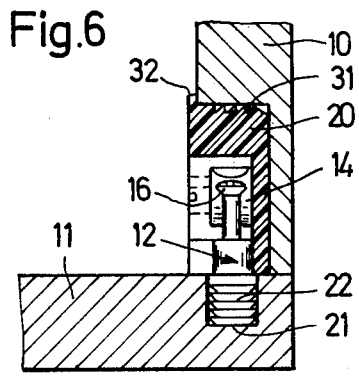
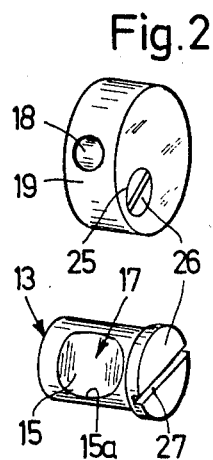
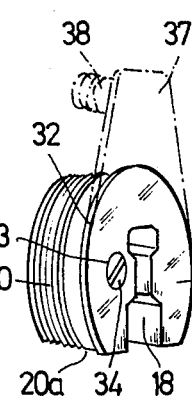
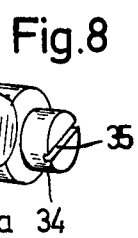
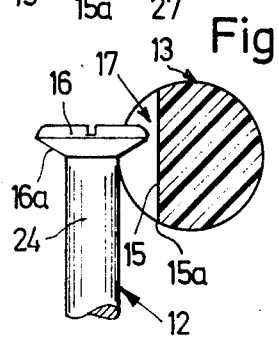
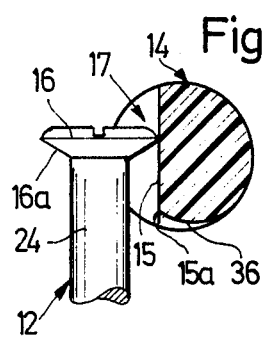
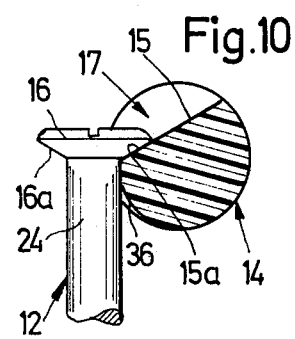
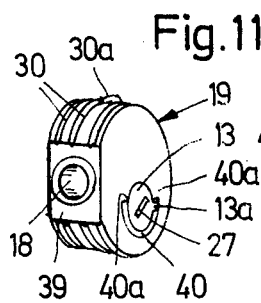
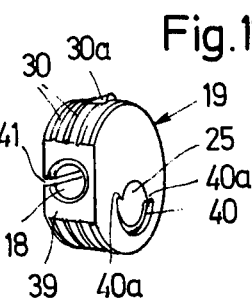
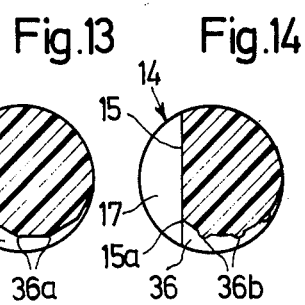

FITTING FOR AN ARTICLE OF FURNITURE

The present invention relates to fitting for the detachable connection of the walls of an item of furniture at an angle to one another comprising a tightening bolt securable in one of the walls, a bearing body disposed in the other wall, and a tie bolt which co-operates with the head of the tightening bolt and engages in the bearing body, the tie bolt being disposed at the said angle to the tightening bolt and being rotatably journalled, the tie bolt being provided at its free end with a tool-receiving aperture.

A fitting of this type is known in which the clamping or tie bolt is formed as a screw bolt having a tapering tensioning portion. When screwed into the bearing body this conical portion engages behind the head of a tightening bolt, and thereby draws the tightening bolt into the bearing body. The clamping or tie bolt and the bearing body must both be threaded. The production of these parts is therefore inconvenient and expensive. During the connection of the fitting members, the clamping or tie bolt has to be almost completely, unscrewed in order that the tightening bolt, with its head portion, can be inserted into the bearing body, and can be moved past the conical portion of the clamping or tie bolt. In order to effect the connection, the clamping or tie bolt must then be screwed down completely. Manipulation of the fitting is therefore complicated. Since the tensioning force is absorbed by the thread, damage to the thread may be caused by repeated tightening and loosening, with the result that the function and durability of the fitting are impaired.

Furthermore, the clamping or tie bolt may project out of the bearing body when it is tightening fully. A smooth exterior configuration of the bearing body extending flush with the surface of the wall and is therefore not achieved.

It is an object of the present invention to provide a fitting of the above type which comprises a minimum number of simply and economically manufactured components and which are countersunk in the walls to be joined. However, whilst being simple and easy to manipulate, it is a subsidiary object to provide a fitting which permits a rapid interconnection of walls of an item of furniture at an angle to each other.

According to the present invention, there is provided a fitting for the detachable connection of the walls of an item of furniture at an angle to one another comprising a tightening bolt securable in one of the walls, a bearing body disposed in the other wall, and a tie bolt which co-operates with the head of the tightening bolt and engages in the bearing body, the tie bolt being disposed at the said angle to the tightening bolt and being rotatably journalled, the tie bolt being provided at its free end with a toolreceiving aperture wherein the tie bolt has a substantially cylindrical external surface, a channelled recess being formed in the cylindrical surface, the edge defining the channel forming a tensioning surface and the longitudinal edge of the channel defining a tensioning or clamping edge.

Preferably, the tie bolt is provided with a further recess adjacent its tensioning or clamping edge, which recess co-operates with a portion of the tightening bolt, the further recess being formed as a channel or groove, the longitudinal direction of this channel or groove extending in the direction of rotation of the tie bolt.

Advantageously, the channelled recess is of pitch circular cross-section, the longitudinal axis of the channel extending at right angles to the axis of rotation of the cylindrical tie bolt.

Further preferably the end portion of the tie bolt, provided with the tool-receiving opening has a cross-sectional area differing from that of the remainder of the tie-bolt.

The entire length of the clamping or tie bolt is disposed in the bearing body, thereby producing a guided, stable arrangment.

The channel-like recess in the clamping or tie bolt enables the head of the tightening bolt to move past it and simultaneously acts as a clamping and holding surface disposed behind the head of the tightening bolt when the latter is in position. The clamping or tie bolt engages behind the head of the tightening bolt by means of the edge of the channellike recess, and reliably tightens the clamping or tie bolt.

In order to effect the connection, only a comparatively small rotation of the clamping or tie bolt is necessary, which considerably simplifies the interconnection process but, which still produces an efficient and durable connection. Even if the clamping or tie bolt is loosened and then retightened, the fitting, due to it having substantially smooth components which contact one another over large surface areas, is reliable in its function, and therefore has a long useful life.

Due to the parts being smooth, and the frictional resistance being reduced thereby, only a small force is required for effecting the connection.

The invention will be further described, by way of example, with reference to the accompanying drawings, in which:

FIG. 1 shows a vertical section through two walls of an item of furniture which are detachable interconnected at a right angle to one another by means of a fitting in accordance with the present invention.

FIG. 2 shows a perspective view of a bearing body forming part of the fitting shown in FIG. 1, the bearing body being locatable in one of the walls to be interconnected and having a torsion or tie bolt fitted therein.

Figure 15:
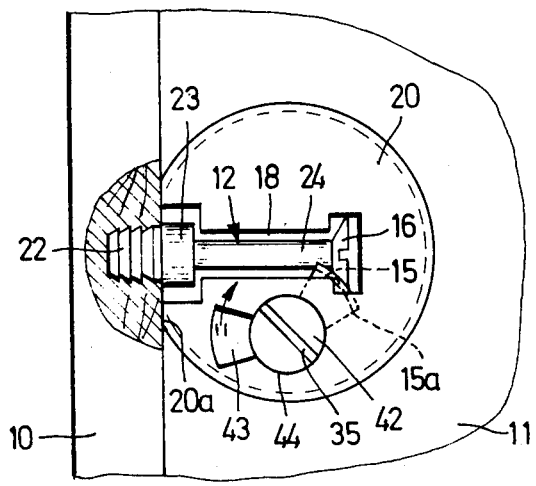
Figure 16:
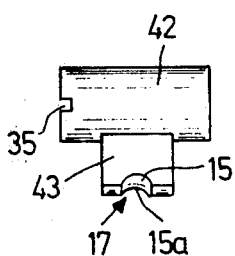
Figure 17:
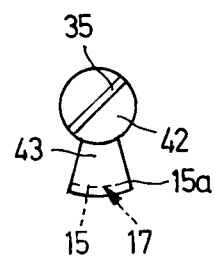

FIG. 3 shows a side view of a tightening bolt forming part of the fitting shown in FIG. 1 which, in use, is fitted into the bearing body and engages in the other wall, FIG. 4 is a perspective view of the torsion or tie bolt shown in FIGS. 1 and 2, FIG. 5 shows a plan view, partially in section, through the torsion or tie bolt shown in FIG. 4 to show its tensioning surface, and of the tightening bolt shown in FIG. 3 with the head of the tightening bolt just having been inserted into the torsion bolt, FIG. 6 shows a vertical section through two walls of an item of furniture which are detachably interconnected at a right angle to one another by means of a second embodiment of a fitting in accordance with the present invention, FIG. 7 shows a perspective view of the bearing body and the torsion or tie bolt of the fitting shown in FIG. 6, FIG. 8 is a perspective view of the torsion or tie bolt of the fitting shown in FIG. 6, FIG. 9 is a view, similar to that shown in FIG. 5 of the torsion or tie bolt and the tightening bolt of the embodiment shown in FIG. 6, FIG. 10 is a view similar to FIG. 9 but showing the torsion or tie bolt retaining the tightening bolt, FIGS. 11 and 12 each show perspective views of different embodiments of bearing bodies utilizable in the fitting of the present invention, FIGS. 13 and 14 each show cross-sections of torsion or tie bolts having modified tensioning surfaces, FIG. 15 shows a plan view of a bearing body with a tightening bolt and a modified torsion or tie-bolt, and the walls of the article of furniture in their interconnected position, FIG. 16 shows a side view of the torsion or tie-bolt shown in FIG. 15, and FIG. 17 shows a front view of the torsion or tie-bolt shown in FIG. 15.

A fitting, in accordance with the present invention, is used, as shown in FIGS. 1 and 6, for the detachable interconnection of two adjacent walls 10, 11 of an item of furniture such as a cabinet, the walls being interconnected at an angle to one another. In the embodiments shown, the angle between the walls 10, 11 is a right angle. The fitting comprises a tightening bolt 12 securable in one wall 10 (FIG. 1) or 11 (FIG. 6), and a torsion member in the form of a tie bolt 13 (FIG. 1) or 14 (FIG. 6). This torsion member is located in the other wall 11 or 10 and comprises a tensioning surface 15 which co-operates with the tightening bolt 12.

The tie-bolt 13 or 14 is a bolt which has a recess formed in its cylindrical surface, this recess forming a tensioning edge 15a which co-operates with the head 16 of the tightening bolt 12 and defines the tensioning surface 15. The tie-bolt 13, 14 is rotatably mounted in a bearing body 19 (FIG. 1) or 20 (FIG. 6), which latter has an insertion opening 18 formed therein to receive the tightening bolt 12, and is held in the wall 10 or 11. At one of its ends, the tightening bolt 12 has a securing portion 22, which is preferably serrated, such as a dowel. This portion 22 engages in a blind bore 21 formed in the wall 10, 11. The tightening bolt 12 also has a cylindrical guide portion 23 adjacent the portion 22 which engages in the bearing body 19, 20. A further cylindrical portion 24, having a reduced diameter relative to the securing and guide portions 22 and 23 and which carries a head portion 16 constitutes the remainder of the tightening bolt. The cross-section of the portions 22, 23 and 24 is preferably circular and all three members are arranged co-axially with one another.

It is also preferably to make the tightening bolt as a single, integer from plastics material. However, it is also possible to make the tightening bolt 12 in two parts, i.e. a plastic portion comprising the securing portion 22 and the guide portion 23, and a screw which engages in this plastic portion, the head of which forms the head 16. FIG. 3 shows an integrally formed tightening bolt 12 whilst FIGS. 5, 9 and 10 shows a separate screw 24 having a head 16. The head 16 of the tightening bolt 12 may be lens-shaped, flat or round, and the underside of the head may extend at either an obtuse angle or at a right angle to the longitudinal direction of the bolt member. The underside of the head, together with the portion 24, forms an engagement surface 16a which co-operates with the tensioning surface 15.

In the embodiment of the fitting shown in FIGS. 1 to 5, the bearing body 19 is substantially cylindrical, the diameter thereof being greater than the depth, and is made of plastics material.

From the cylindrical surface of the bearing body 19, an insertion opening 18, in the form of a blind bore, extends radially into the body 19. The guide portion 23 engages partially into said opening 18. The bearing body 19 is also provided with a bearing bore 25 extending parallel to the longitudinal axis of the cylinder, which bore is eccentric of the axis. In this bore 25, the torsion or tie bolt 13 is journalled to rotate. The two bores 18, 25 intersect each other in such a manner that the bearing bore 25 intersects the insertion bore 18 substantially midway between the ends of the latter and is in lateral communication therewith. The tie bolt 13 is in the form of a cylindrical bolt having an enlarged head portion 26 at one end, which head portion defines a shoulder such that, in use, the bolt 13 cannot pass through the bore 25 in the bearing body 19. On one face of the head portion 26, a tool insertion recess 27 such as a flat or cross-head slot, or a hexagonal slot, is provided so that the bolt 13 can be rotated by means of a screwdriver or Allen key. In use, the face of the bolt 13 lies flush with the face of the bearing body 19, the bolt having a total length corresponding to the depth of the bearing body 19.

Substantially mid-way along its cylindrical surface, the bolt 13 is provided with a recess 17 formed by a hollow groove, which may be in the form of a pitch circle-depression which defines a tensioning surface 15 and a tensioning or clamping edge 15a on one side thereof.

The longitudinal axis of the recess 17, which latter may be in the form pitch circle, groove, a prismatic groove or a trapezoidal groove, extends at an angle, preferably a right angle, to the longitudinal axis of the bolt 13.

The cylindrical bearing body 19 is, in use, located in a blind bore 28 formed in one of the walls 11 or 10, the open end of this bore 28 being located spaced apart from the edge of the wall in contact with the adjacent wall 10 or 11. A bore 29 is formed in the surface of the wall which is to contact the adjacent wall 10 or 11, which bore 29 communicates with the blind bore 28.

The tightening bolt 12 to be secured in the wall 10 is inserted in the wall 11 by passing the guide portion 23 and the cylindrical portion 24 carrying the head 16, through the bore 29 of the wall 11 and through the insertion opening 18 into the bearing body 19. The bolt 13 has previously been rotated so that insertion opening 18 is exposed, the bearing body already having been inserted into the wall 11. The position of the bolt after insertion is shown in FIG. 5. The walls 10, 11 are now loosely joined to each other. The bolt 13 is then axially rotated by means of a tool and its tensioning surface 15, defined by the recess 17, moves below the head 16 of the bolt 12. The tensioning edge 15a of the bolt 13 co-operates with the surface 16a of the head, and draws the head 16, and thus the bolt 12, so that the wall 10 is firmly connected to and in abutment with the edge of the wall 11.

The embodiment of the fitting shown in FIGS. 6 to 10 will now be described.

The tightening bolt 12 shown in FIG. 3 is also used in this embodiment. The bearing body 20, shown in FIG. 7, is formed in a cylindrical manner from plastics material with a basically pitch circle-like shape. The pitch circle-like basic shape is created by omitting a portion of a circle, such that the bearing body 20 has a plane surface 20a on its circumference. This surface 20a fits flush with the edge of the wall 10 or 11 in which the bearing body 20 is located.

The cylindrical surface of the bearing body 20 is provided with serrations 30 so that it can be securely mounted in a blind bore 31 formed in the wall 10 or 11 and has a bearing or contact edge 32, formed on one of its end faces. A recess 18 is provided in this end face of the bearing body 20 substantially in the medial transverse plane of the body which penetrates into the body. The recess 18 is open towards the plane surface 20a. This recess 18 is in the form of a slot which may have a shape corresponding substantially to the external configuration of the tightening bolt 12, so that the bolt 12 frictionally engages in the recess 18. Laterally of the recess 18, a bearing bore 33 is provided in the bearing body 20 which receives the tie bolt 14. This bore 33 extends substantially parallel to the longitudinal axis of the body.

The tie bolt 14 is formed as a cylindrical bolt which has, at one end, shoulder portion 34 of reduced diameter cross-section in relation to the remainder of the bolt. In one face of the portion 34, an opening 35 for a tool, such as a screwdriver or an Allen key, is provided. The bolt 14 is inserted into the bearing body 20 from the front in such a manner that its shoulder portion 34 is located in the region of the bearing edge 32 of the bearing body 20. The bolt 14 has a total length corresponding to the depth of the bearing body 20.

On its cylindrical surface, the bolt 14 has an aperture 17 in the form of a recess, and may be a channellike depression having a pitch circular prismatic or trapezoidal cross-section. The aperture 17 extends longitudinally and defines a tensioning surface 15 with a tensioning or clamping edge 15a on one face. In order to obtain better engagement of the bolt 14 with the tightening bolt 12 in the tensioned position, a further recess 36 may be provided in the bearing body adjacent the tensioning edge 15a, the cylindrical portion 24 of the bolt 12 being partially located in this recess in the tensioned state of the fitting.

In the embodiment shown in FIG. 1, the tightening bolt 12 is secured in a blind bore 21 formed in the wall 11. The bearing body 20 is also disposed in a blind bore 31 in the wall 10, which bore is, however, open on its edge adjacent to the wall 11. In use the plane surface 20a of the bearing body 20 closes this open side of the blind bore hole 31.

The wall 10, with the bearing body 20 located therein is moved in the direction of the wall 11 and in the plane thereof until the tightening bolt 12 projecting out of the wall 11 passes into the insertion aperture 18 of the bearing body 20. The tie bolt 14, located in its bearing bore 33 which also communicates with the aperture 18, is rotated so that the tightening bolt 12 can be smoothly inserted into the aperture 18. The bolt 14 is then in the position shown in FIG. 9.

The walls 10, 11 are thus in contact with one another. The torsion bolt 14 can now be rotated by means of a tool, so that its tensioning surface 15 becomes disposed below the head 16 of the tightening bolt 12 and its tensioning edge 15a presses against the surface 16a of the head. This draws the walls 10 and 11 together, FIG. 10 shows the tensioning head 15a and the tensioning surface 15 firmly disposed below the head 16 and the surface 16a. The bore 36 partially surrounds the bolt member 24. In order to prevent extraction of the bearing body 20 located in the plane of the wall from the open end of the blind bore 31 when the bearing body 20 is subjected to high tractive and rotational forces the bearing edge 32 may be formed, on its side opposed to the plane cylindrical surface 20a, with a securing flange 37 projecting beyond the body 20, the flange being provided with securing pins 38 engaging in the wall 10.

The torsion bolt 13, 14 is preferably manufactured integrally from plastics material.

It is also possible to locate the torsion bolt 13, 14 in the central region of the bearing body 19, 20. However, to do this the insertion aperture 18 must be eccentrically located in the bearing body 19, 20.

FIG. 13 shows a tie bolt 14 in which a recess 36 is provided adjoining the recess 17, which recess 36 extends eccentrically in the circumferential direction of the bolt. This recess 36 has a polygonal base (36a) and thus forms a tightening surface which engages with a locking action below the head 16 of the tightening bolt 12.

FIG. 14 shows a tie bolt 14 also having a recess 36 which extends eccentrically in the circumferential direction of the bolt, but is provided on its base with pegs 36b which are arranged in spaced relationship with one another. These pegs engage with a locking action behind the head 16 of the tightening bolt.

The eccentrically extending base surface of the recess 36 may also be oval quadrilateral, or other shapes in order to form a tensioning surface which co-operates efficiently with the head 16 and is adjacent to the tensioning edge 15a.

FIGS. 11 and 12 disclose different embodiments of the bearing body 19. This bearing body 19 has a basically circular form and is provided on its surface with a flattened portion 39. The countersunk insertion aperture 18 extends into the bearing body 19 from this portion 39.

The plastics bearing body 19 is provided on its cylindrical surface with annular anchoring projections 30 and serrations 30a, which prevent extraction of the bearing body from its bore.

The tie bolt 13 which is provided eccentrically in the bearing body is provided at its operative end with a tool receiving recess 27, such as a slot to receive a screwdriver; and also has a laterally projecting limiting peg 13a by means of which it can move in an aperture 40 in the bearing body 19 extending in a pitch circle around the tie bolt 13. This opening 40 has at each end, stops 40a form limiting the rotation of the tie bolt 13.

The bearing body 19 shown in FIG. 12 is also provided with a slit 41 which extends from the flattened portion 39 to the opposed face of the bearing body 19 assuming, in its centre, the entire basic form, and extending to a predetermined depth in the body 19. The bearing body 19 can thus be deformed. When the bearing body 19 is pressed into the bore 28 in the wall, it can be compressed so as to easily pass through due to the slot 41 so that the projections 30, 30a on the surface of the body are not damaged. When the bolt 16 is tightened by the tie bolt 13, 14, the bearing body 19 resumes its original shape resulting in a secure press-fit against the surface of the bore.

In the embodiment shown in FIGS. 15 to 17, the tensioning surface 15 and the tensioning edge 15a are provided on a surface projection 43 of the tie bolt 42. This tie bolt 42 is disposed with its projection 43 located in a key-hole recess 44 formed in the bearing body 20. This key-hole recess 44 is disposed in such a manner that it is spaced apart from the insertion opening 18.

This bearing body 20 corresponds in construction and action to the bearing body shown in FIG. 7, and the same reference numerals are used for the same features. The only difference between the two bodies is that the bearing bore 44 is in key-hole form in FIG. 15 whilst the bore 33 in FIG. 7 is not. The tie bolt 42 engages as it is turned, firstly by its clamping edge 15a engaging behind the head 16 of the tightening bolt, the wall 10 thereby being drawn against the wall 11. By further turning of the tie bolt, the tensioning surface 15 locates itself behind the head 16. Finally, the tie bolt 42 is locked in position with its projection 43 engaging behind the head 16 and is thereby automatically prevented from unlocking itself.

The projection 43 is provided in substantially the medial transverse plane of the cylindrical tie bolt 42, which latter is of circular cross-section. A tool receiving aperture 35 is provided at one end of the tie bolt. The bearing body 20 is hollowed out internally so that the projection 43 can be turned.

This embodiment enables the tightening bolt 12 to be secured in the wall 10 and the bearing body 20 and the tie bolt 42 to be fixed in the wall 11 before the connection of the two walls is effected. The wall 11 can thus be simply lowered over the tightening bolt 12, and the connection is the effected by turning the tie bolt 42. The insertion opening 18 in the bearing body 20 has a I-shaped cross section, and the key-hole opening 44 extends with its axis of symmetry parallel to the longitudinal axis of the tightening bolt. The projection when the walls are not connected is directed towards the flattened portion 20a of the bearing body 20.

The tensioning or clamping surface 15, which is formed by the base of the groove of the tie bolt in this embodiment extends eccentrically to the axis of rotation of the tie bolt.

I claim:

1. A fitting for detachably interconnecting two walls of an item of furniture at an angle to one another, comprising a bearing body locatable in a recess in a first of said walls, said bearing body having two bores formed therein extending at an angle to one another, said bores communicating one with the other, a torsion bolt rotatably journalled in the first of said bores and carrying, on one of its end faces, tool receiving means, said torsion bolt having an external surface, said external surface being channelled to form a first groove, and a tightening bolt locatable in the second of said bores in said bearing body, said tightening bolt comprising a securing portion engageable in the second of said walls, a guide portion engaging at least partially in said second bore and a head portion, said head portion co-operating with the surface and at least a part of the perimeter of said grooves in said torsion bolt, whereby said co-operation draws said head of said tightening bolt into said bearing body causing said two walls to be connected and causing said tightening bolt to be locked in position relative to said bearing body, said torsion bolt being provided with a projection extending laterally from the end region of said torsion bolt provided with said tool receiving means, said bearing body being provided with at least one upstanding projecting portion around the periphery of said bore receiving said torsion bolt whereby said projection on said torsion bolt co-operates with said at least one upstanding projecting portion formed on said bearing body to limit rotation of said torsion bolt in said bore.

2. A fitting for detachably interconnecting two walls of an item of furniture at an angle to one another, comprising a bearing body locatable in a recess in a first of said walls, said bearing body having two bores formed therein extending at an angle to one another, said bores communicating one with the other, a torsion bolt rotatably journalled in the first of said bores and carrying, on one of its end faces, tool receiving means, said torsion bolt having an external surface, said external surface being channelled to form a first groove, and a tightening bolt locatable in the second of said bores in said bearing body, said tightening bolt comprising a securing portion engagable in the second of said walls, a guide portion engaging at least partially in said second bore and a head portion, said head portion co-operating with the surface and at least a part of the perimeter of said groove in said torsion bolt, whereby said co-operation draws said head of said tightening bolt into said bearing body causing said two walls to be connected and causing said tightening bolt to be locked in position relative to said bearing body, said torsion body being channelled to provide a further groove located adjacent the perimeter of said first groove, the longitudinal direction of said further groove extending in the direction of rotation of said torsion bolt and eccentrically around said torsion bolt, said further groove defining a tensioning surface engaging behind said head portion of said tightening bolt, said tensioning surfaces having projections formed thereon.

3. A fitting for detachably interconnecting two walls of an item of furniture at an angle to one another, comprising a bearing body locatable in a recess in a first of said walls, said bearing body having two bores formed therein extending at an angle to one another, said bores communicating one with the other, a torsion bolt rotatably journalled in the first of said bores and carrying, on one of its end faces, tool receiving means, said torsion bolt having an external surface, said external surface being channelled to form a first groove, and a tightening bolt locatable in the second of said bores in said bearing body, said tightening bolt comprising a securing portion engageable in the second of said walls, a guide portion engaging at least partially in said second bore and a head portion, said head portion co-operating with the surface and at least a part of the perimeter of said groove in said torsion bolt, whereby said co-operation draws said head of said tightening bolt into said bearing body causing said two walls to be connected and causing said tightening bolt to be locked in position relative to said bearing body, said external surface of said torsion belt comprising a substantially cylindrical surface portion and an outwardly directed projection portion, said projecting portion having said groove formed in its outer edge, said first bore in said bearing body having a cross-section which is substantially keyhole shaped, whereby said projection portion on said torsion bolt engages behind said head portion of said tightening bolt.

* * * * *